United States Patent [19]
Schaefer

[11] 3,867,120
[45] Feb. 18, 1975

[54] ROADWAY MARKER AND METHOD OF MAKING IT

[76] Inventor: Howard A. Schaefer, c/o Anchor Hocking Corporation, Lancaster, Ohio 43130

[22] Filed: Nov. 9, 1972

[21] Appl. No.: 305,167

Related U.S. Application Data

[63] Continuation-in-part of Ser. No. 296,947, Oct. 12, 1972.

[52] U.S. Cl............................. 65/62, 65/69, 65/114, 404/12
[51] Int. Cl............................................. C03b 27/00
[58] Field of Search.............. 65/64, 114, 62; 404/9, 404/12, 16

[56] References Cited
UNITED STATES PATENTS

| 1,685,449 | 9/1928 | Durand | 404/16 |
|---|---|---|---|
| 3,693,511 | 9/1972 | Medynski | 404/16 X |

FOREIGN PATENTS OR APPLICATIONS

| 402,641 | 12/1933 | Great Britain | 65/114 |
|---|---|---|---|
| 358,242 | 0/1938 | Italy | 404/9 |
| 234,561 | 12/1942 | Switzerland | 65/114 |

Primary Examiner—Arthur D. Kellogg
Attorney, Agent, or Firm—Connolly and Hutz

[57] ABSTRACT

A roadway marker comprises a body member made of tempered glass so that it will disintegrate into small particles with minimal sharp fracture edges upon failure thereof, but has an impact strength of at least 10,000 psi.

13 Claims, 9 Drawing Figures

PATENTED FEB 18 1975 3,867,120
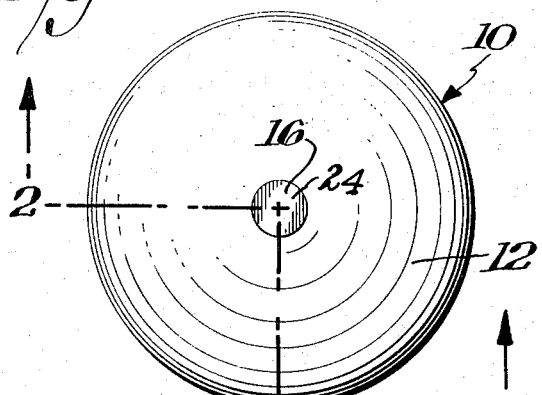
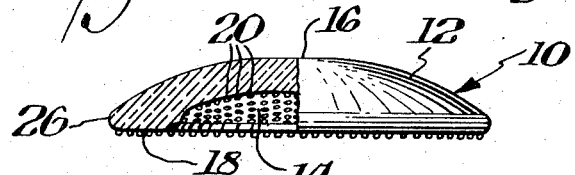
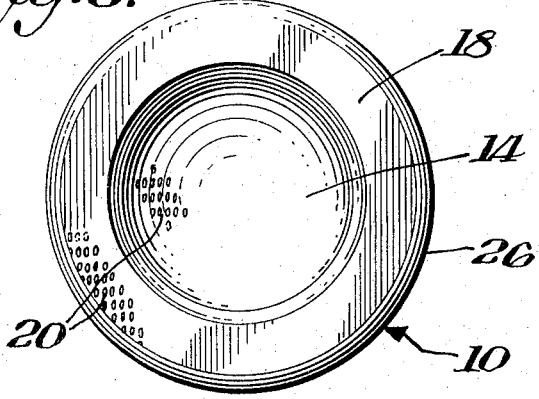
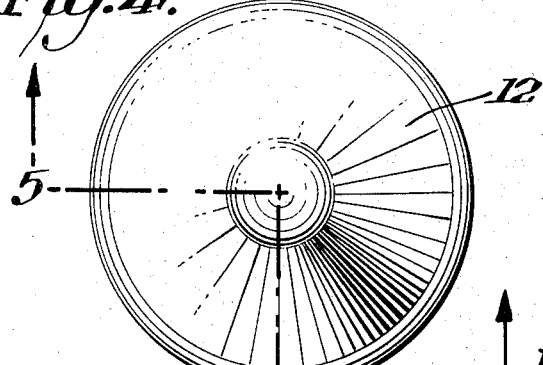
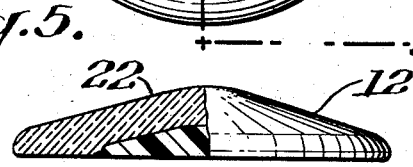
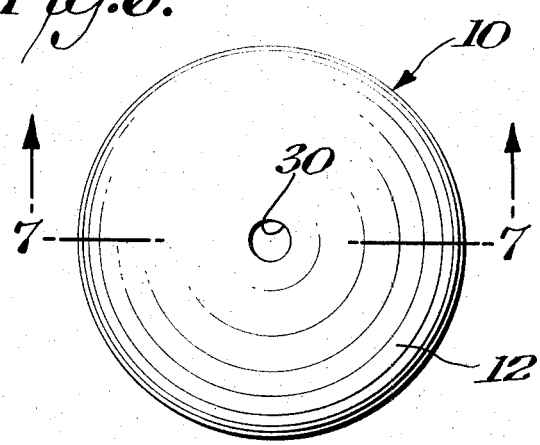
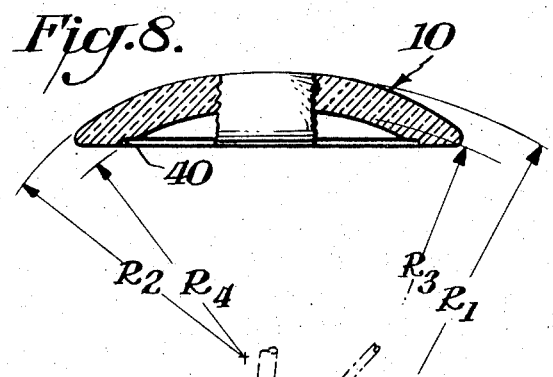
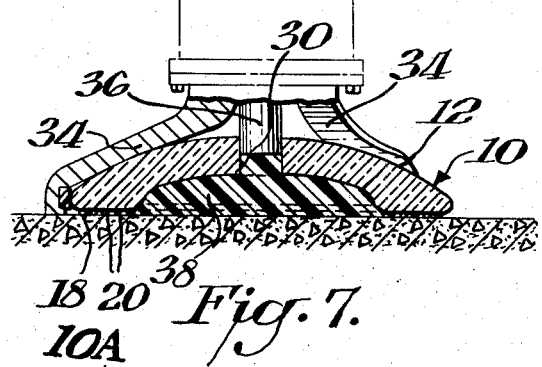
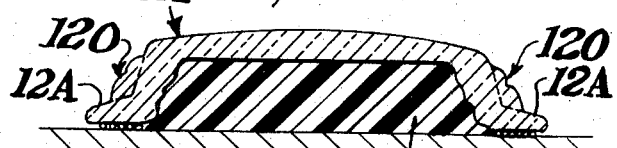

ROADWAY MARKER AND METHOD OF MAKING IT

CROSS-REFERENCE TO RELATED APPLICATION

This application is a continuation-in-part of parent application Ser. No. 296,947, filed Oct. 12, 1972, entitled Reflective Roadway Marker.

BACKGROUND OF INVENTION

As pointed out in the parent application, roadway markers have long been used in the prior art. In addition to the prior art noted in the parent application other exemplary prior art includes 1,479,227; 1,685,449; 1,703,227; 1,830,319; 2,321,476; 2,699,982; 3,096,694; Des. 89,606; Des. 205,049; Des. 207,930; Des. 215,625; British Pat. No. 265,303; British Pat. No. 296,907; French Pat. No. 405,486; French Pat. No. 803,015.

The prior art has generally utilized ceramic, plastic, rubber or metallic roadway markers. The parent application points out various disadvantages with certain conventional prior art materials particularly where such materials are intended to be incorporated in a reflective roadway marker. Despite the numerous disadvantages with prior art approaches serious consideration has never really been given to using glass as the material for the marker. While the advantages of glass might suggest the desirability of this material because of its highly developed state of technology and its ready availability, other physical properties of glass have been considered so detrimental that the prior art has continued to resort to other materials. The primary disadvantages of glass is the low impact strength and the consequent road hazzard which would result in sharp pieces of glass which would be placed near the roadway.

SUMMARY OF INVENTION

An object of this invention is to provide a roadway marker which overcomes the disadvantages of the prior art.

A further object of this invention is to provide such a roadway marker wherein the marker body is made of glass.

In accordance with this invention a roadway marker is provided which includes a body member made of tempered glass so that it will disintegrate into small particles with minimal sharp fracture edges upon failure thereof, but has an impact strength of at least 10,000 psi.

The body may have a concave interior and a peripheral rim which is mounted against the roadway.

In one embodiment of this invention the body includes a top wall spaced above the peripheral rim with an opening completely therethrough to serve a multiple of functions including providing a hole through which adhesive material may be inserted, providing a means for temporarily mounting the device during application of the adhesive and providing a vent opening which is utilized during the curing of the adhesive for escape of the heat and steam created thereby.

THE DRAWINGS

FIG. 1 is a top plan view of a roadway marker in accordance with this invention;

FIG. 2 is a cross-sectional view taken through FIG. 1 along the line 2—2;

FIG. 3 is a bottom plan view of the marker shown in FIGS. 1–2;

FIG. 4 is a top plan view of a further embodiment of this invention;

FIG. 5 is a cross-sectional view taken through FIG. 4 along the line 5—5;

FIG. 6 is a top plan view of yet a further embodiment of this invention;

FIG. 7 is a cross-sectional view taken through FIG. 6 along the line 7—7 and illustrating a manner of mounting the marker to the roadway;

FIG. 8 is a cross-sectional view similar to that of FIG. 2 of a further modification; and FIG. 9 is a cross-sectional view of a marker in accordance with this invention and as illustrated in the parent application.

DETAILED DESCRIPTION

The main thrust of the parent application was the provision of a reflective roadway marker. The details of that application are incorporated herein by reference thereto and to avoid a repetition of that description the present description will be directed primarily to non-reflective markers.

FIGS. 1–3 illustrate a marker 10 formed in accordance with this invention. As indicated therein marker 10 includes a body member 12 which as later described is made of tempered glass. The body member has a concave interior 14 with a top wall 16 spaced above peripheral rim 18. As shown in FIG. 2 the plunger side or concave interior 14 as well as rim 16 is provided with stippling 20 which creates pockets for better receiving adhesive material so that the marker may be secured to the road. In a preferred form of this invention, however, the stippling is provided only on rim 18 although if desired the stippling may be omitted completely.

In use although not illustrated in FIG. 2 the interior of body 12 is filled with a potting compound such as indicated by the reference numeral 22 in FIG. 5. The potting compound adds strength to the marker and provides an enlarged area to which a suitable adhesive may be applied for firmly securing the marker to the road. Any suitable potting compound such as conventionally used in the art may be utilized in accordance with this invention.

In the embodiment illustrated in FIGS. 1–3 the body is dome-shaped tapering at a shallow acute angle and if desired may include a flattened surface 24. In general, however, the external surface of the body above rim 28 is formed of spherical segments and cylindrical segment surfaces. Thus, for example, when viewed in cross-section as illustrated in FIG. 2 the edge above rim 18 is rounded and of generally circular cross section. The main portions of the top wall of body 12 is formed of spherical segements.

FIGS. 4–5 illustrate an alternative form of marker which follows the same general principles as the embodiment of FIGS. 1–3, but is slightly less dome-like than the prior embodiment.

FIGS. 6–7 illustrate a particularly advantageous form of this invention wherein a hole 30 is formed in the top wall of body 12 and extends completely therethrough being spaced above rim 18. The hole serves a multiple of functions with respect to the mounting and securement of the marker to the road. As illustrated in FIG.

7, for example, a suitable thermo-adhesive applying implement is schematically illustrated by the reference numeral 32. This implement may include spaced fingers 34 which fit around the outside of marker 10. A hollow axial finger 36 is provided on applicator 32 and fits snugly within hole 30. Thus hole 30 functions in the initial placement of the marker on the road by providing means into which the finger 36 may project. An additional function of hole 30 is its utilization as a passageway through which a suitable thermo-adhesive may be squirted through hollow finger 36. The adhesive 38 then fills the hollow interior of the body and may work its way into the stippling on rim 18 or conversely rim 18 may be provided with its own adhesive. Where a thermo-adhesive is used hole 30 serves still another function. In this respect during curing of the adhesive the applicator 32 is removed thus exposing hole 30 to the atmosphere. Accordingly, the heat and steam created during the curing of the adhesive may be conveniently vented through hole 30. This latter feature represents a particular improvement over the prior art where it is sometimes necessary to employ individuals for the sole purpose of pressing the prior art markers against the roadway to overcome the tendency of such markers to pop up from the roadway because of the forces created by the heat and steam with no provisions being provided for their venting.

FIG. 8 illustrates yet a further embodiment of this invention which is generally similar to the embodiment illustrated in FIG. 2. As indicated in FIG. 8 the outer contour of marker 10 is particularly shaped to minimize any danger of being a pedestrian hazard and thus may be advantageously utilized for cross-walk delineation. In case a pedestrian should step on marker 10 he would not be as apt to trip over the marker as with conventional designs. Moreover, the contour and design of the marker illustrated in FIG. 8 also better distribute the loading stresses when a vehicle runs over it although it will still act as a rumble strip to signal a driver that he is passing into or through a danger zone. In the embodiment illustrated in FIG. 8 the outer contour is formed essentiallay of two radii. In this respect radius $R_1$ is, for example, 6 inches long and located on center to form a curvature in the central area of the marker. The remainder of the marker is generally formed by radius $R_2$ which is displaced 7/32 inches and is of a magnitude of 2-15/16 with the outer contour terminating in a 1/8 inch radius fillet. The internal contour includes a central area formed by on center radius $R_3$ which is 5⅝ inches and blends into offset raidus $R_4$ of 2-9/16 inches. Radius $R_4$ is similar offset 7/32 inches. The resultant internal diameter is 3 inches while the external diameter is 4 inches and the marker has an overall height or thickness of ¾ inches. The internal contour further includes an annular ridge or groove 40 and the internal contour is specifically designed for manufacturing adaptability.

Where utilized as a non-reflective marker such as at cross-walks or to delineate other designated areas, marker 10 may be colored as by being made from a colored glass or by using a colored filler or potting compound and generally transparent glass. Alternatively, the interior of the glass may be colored by the application of a suitable ceramic color thereto which is then buried or shielded by the thickness of the glass on one side and the potting compound on the other side.

FIG. 9 illustrates the concepts of this invention utilized with a reflective roadway marker 10A as described in parent application Ser. No. 296,947 which includes glass body 12A and retroreflective optical systems 120 and wherein body 12A is filled with a potting compound 38A for sealing to the highway surface.

A particular notable contribution of the present invention is the teaching that the marker may be made of a glass material overcoming the disadvantages which would normally be attendant with such material, by tempering the glass during manufacture of the marker. Any suitable glass material such as soda lime or a zinc opal glass batch may be used. The glass body is molded in a conventional manner to its desired shape. Where color application is required, after being molded, a ceramic color is sprayed on the interior of the body. The body is then treated such as by heating to the softening temperature of about 1,300°F to automatically fire the ceramic color into the glass. Next the heat treated body is air quenched in a suitable manner to simultaneously impart high compression strains on all surfaces by applying the proper velocity and volume of air to all surfaces at the same time from a suitable nozzle. The foregoing heat treatment results in building tremendous mechanical strength in the body. For example, such a marker would have an impact strength greater than 10,000 psi. Additionally, the tempered glass which results from this heat treatment is such that if there should be failure, the glass body would disintegrate into particles wherein the fracture surfaces are generally rounded with minimal sharp edges so as to minimize any road hazard which might otherwise be created. It is emphasized that the utilization of such tempered glass as a roadway marker represents a distinct departure from the prior art and a significant teaching of this invention.

I claim:

1. A roadway marker comprising a body member, said body member being made of tempered glass capable of disintegrating into small particles with minimal sharp fracture edges upon failure and breakage of said body member, said body member having an impact strength of at least 10,000 psi, said body member being concave with an internal cavity exposed at its lower surface, said internal cavity being filled with a sealing compound, said body member having securing means on its bottom surface including the exposed surface of said compound for securement of said marker to a roadway, and the external surfaces of said body member above said securing means being of smooth contour.

2. The marker of claim 1 wherein the bottom of said body member is stippled.

3. The marker of claim 1 wherein said marker is non-reflective.

4. The marker of claim 3 wherein said body member is dome-shaped tapering at a shallow acute angle.

5. The marker of claim 4 wherein said body member has a peripheral rim at its base, and the external surface of said body member above said rim is formed of spherical segments and cylindrical segment surfaces.

6. The marker of claim 1, in combination therewith, a roadway having an upper surface, and said marker being secured to said roadway completely above said surface.

7. The marker of claim 1 wherein said body member includes at least one side wall having a retroreflective optical system incorporated therein.

8. The marker of claim 1 wherein said marker is reflective.

9. The marker of claim 1 wherein said compound is a thermo-adhesive sealing compound.

10. A roadway marker comprising a body member, said body member being made of tempered glass capable of disintegrating into small particles with minimal sharp fracture edges upon failure and breakage of said body member, said body member having an impact strength of at least 10,000 psi, said body member having securing means on its bottom surface for securement of said marker to a roadway, the external surfaces of said body member above said securing means being of smooth contour, said body member having a concave interior, said securing means including a peripheral rim at the base of said body member for mounting against the roadway, said body member having a top wall spaced above said peripheral rim an opening extending completely through said top wall and also being spaced above said rim to provide access to the hollow interior of said body member, and a sealing compound being inserted through said opening and filling said opening and the concave interior of said body member.

11. A method of making a one piece unitary tempered glass roadway marker including the steps of molding the marker body of glass material, heating the body to its softening temperature, and fluid quenching the body by applying fluid to all surfaces thereof at the same time to simultaneously impart high compression strains on all surfaces of the body until the body has an impact strength of at least 10,000 psi, including the step of forming a hole completely through the top wall of the body, and including injecting a flowable adhesive through the hole to provide securing means over an area larger than the hole.

12. The method of claim 11 including applying a ceramic coloring to the interior of the body prior to the heating step.

13. The method of claim 11 including providing securing means on the bottom of the marker, and mounting the marker on the roadway completely above the roadway surface.

* * * * *

UNITED STATES PATENT OFFICE
CERTIFICATE OF CORRECTION

PATENT NO. : 3,867,120
DATED : February 18, 1975
INVENTOR(S) : Howard A. Schaefer It is certified that error appears in the above-identified patent and that said Letters Patent are hereby corrected as shown below:

On the title page after line "[76]" insert
---[73] Assignee: Anchor Hocking Corporation, Lancaster, Ohio ---

Column 2, line 52, "28" should be --- 18 ---

Column 3, line 43, "essentiallay" should be --- essentially ---

Signed and sealed this 6th day of May 1975.

(SEAL)
Attest:

RUTH C. MASON
Attesting Officer

C. MARSHALL DANN
Commissioner of Patents
and Trademarks